United States Patent [19]
Manfredi

[11] 3,808,413
[45] Apr. 30, 1974

[54] POLAR RESOLVER
[75] Inventor: Urbano Manfredi, Maitland, Fla.
[73] Assignee: The United States of America as represented by the Secretary of the Navy, Washington, D.C.
[22] Filed: Apr. 23, 1973
[21] Appl. No.: 353,272

[52] U.S. Cl. ............................... 235/186, 235/189
[51] Int. Cl. ............................................. G06g 7/22
[58] Field of Search ...... 235/186, 189, 197, 150.26, 235/150.27

[56] References Cited
UNITED STATES PATENTS
3,482,086  12/1969  Caswell ........................... 235/189 X
3,584,783  6/1971  Kobori ............................. 235/186 X
3,671,731  6/1972  Denoncourt et al. ............ 235/189 X
3,710,088  1/1973  Blaschke et al. ................. 235/186 X Primary Examiner—Joseph F. Ruggiero
Attorney, Agent, or Firm—Richard S. Sciascia; J. W. Pease

[57] ABSTRACT

A polar resolver for developing analog voltage outputs corresponding to X and Y coordinate input data through the provision of divider-inverter means to develop suitable X, Y, and R (the vector of X and Y) function voltage outputs corresponding to progressive accretions of angle $\theta$ and applying such outputs to switching and summing amplifier means.

2 Claims, 4 Drawing Figures

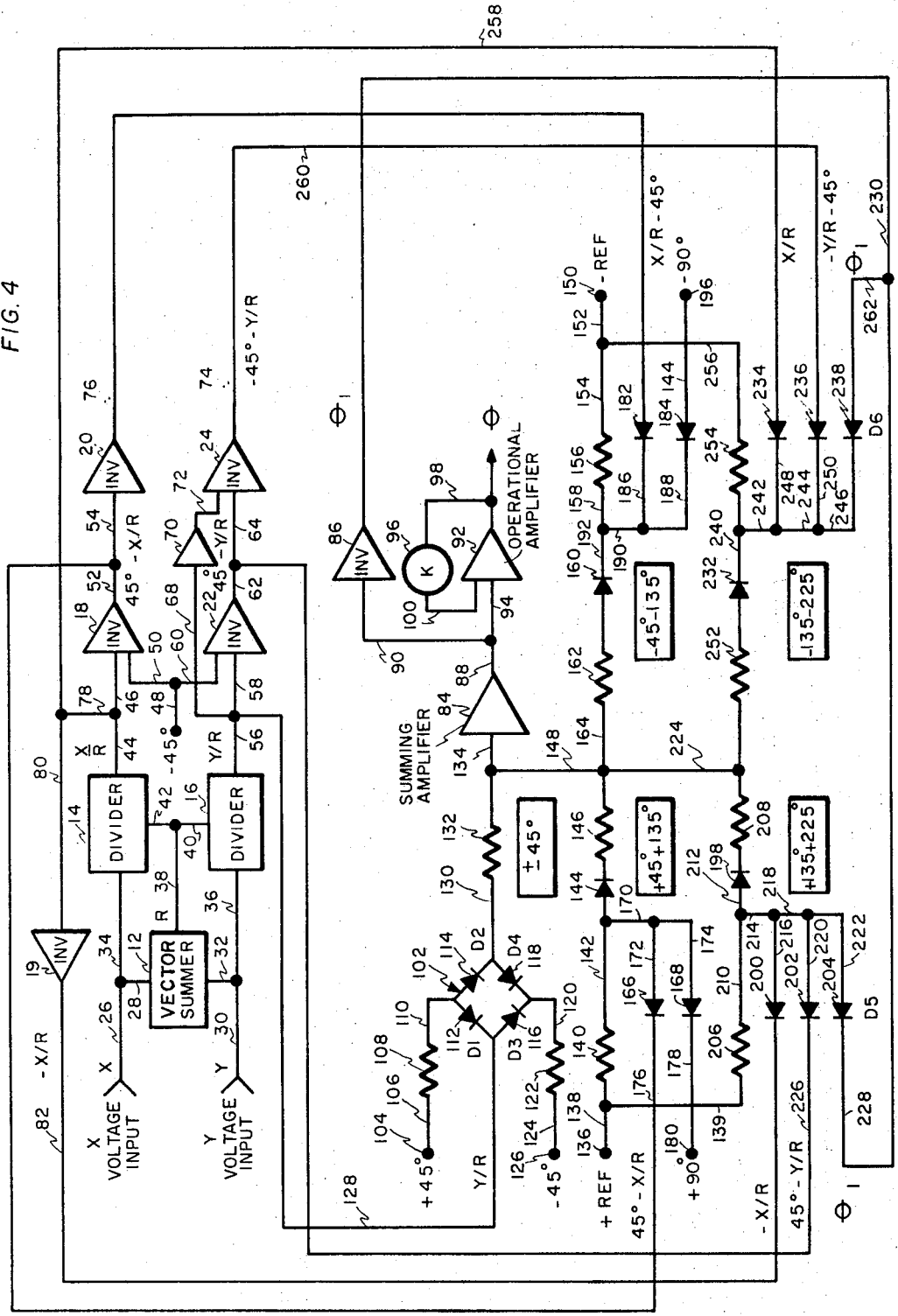

POLAR RESOLVER

BACKGROUND OF THE INVENTION

This invention is in the field of angle conversion and/or generation apparatus and in a more limited sense to such apparatus utilizing an output voltage proportional to an angle.

In the past the normal procedure for obtaining analog voltage corresponding to angular data has been through the utilization of sine and cosine functions. However, in the present state of electronic equipment art it is quite often feasible to obtain from electronic equipment output of voltages corresponding to X and Y components. It would be quite useful, therefore, in such equipment to provide a polar resolver for providing an analog voltage representative of the angle $\theta$ corresponding to any given X and Y coordinates as orthogonal components (two input signals) used to generate a resultant angle. The method of using multipliers and function generators for solving the equation $X \sin \theta = Y \cos \theta$ by closed loop action has the disadvantage of being complicated, costly, bulky, and of limited response speed.

Another conventional electromechanical approach to solution of such a problem is to use a resolver-servo motor. Such solution, however, is again limited in speed of response and has an ambiguity in the mechanical angle which satisfies the control system.

SUMMARY OF THE INVENTION

A novelty in the invention disclosed herein is the provision of electronic means of relatively simple structure and cost which will respond to X and Y inputs to provide analog voltage outputs corresponding to specific associated angles which are corrected for ambiguity factors to provide a satisfactorily accurate result and which do not utilize or require the solving of trigonometric functions. In a preferred embodiment vector summer means, divider means and inverter means are provided to develop, responsive to X and Y input voltages, output voltages which are fucntions of X, Y and R, the latter being the vector of X and Y, each function being representative of a specific range of angle $\theta$. The above is combined with a switching and summing circuit means, responsive to the output functions voltages, to provide a progressive angular summing from $+0°$ to $+225°$ and from $-0°$ to $-225°$ while also making provision for using one unconnected output of angle $\theta$ voltage as a feedback to correct for possible ambiguity and establish stabilization in critical angle areas.

DESCRIPTION OF THE DRAWINGS

Other objects and many of the attendant advantages of this invention will become readily appreciated as the same becomes better understood by reference to the following detailed description when considered in connection with the accompanying drawings wherein:

FIG. 4 is a diagram, partially in block and partially schematic, of an embodiment of the polar resolver of this invention.

DESCRIPTION OF THE PREFERRED EMBODIMENT

The subject invention provides a response to the problem of obtaining polar transformation without utilizing trigonometric functions to thereby provide simplicity and low cost and is further directed to improvements which eliminate instability and provide acceptable accuracy. In accomplishing the above, the approach adopted is one based upon the fact that the ratio of the area of a sector of a circle is to the area of the circle as the sector angle $\theta$ is to $2\pi$. Thus, in FIG. 1 the pie-shaped portion, OACB, of the circle 10 is called a sector and bears a relationship to the area of the circle 10 which corresponds to the relationship of $\theta$ to $2\pi$.

The area of the sector is conventionally obtained from the formula $A_s = \frac{1}{2} R^2 (\theta - \sin \theta)$. However, since we wish to avoid the complications of circuitry involved in trigonometrics, we can obtain an approximate area as $A_s \cong [(X+h)Y/2]$. The coordinates X and Y, the vector radius R and the X axis dimension, where $X + h = R$, being shown in FIG. 1. This is an approximate area of the sector because the calculation lacks the segment ACB shown in shaded area in FIG. 1. This is the error portion and indicated as E. Using the formula $A_s \cong [(X+h)Y/2]$ where $X+h = R$ and the circle area $A_o = \pi R^2$, then $(A_s/A_o) = (\theta/2\pi)$ and simplifying, $\theta = (2\pi A_s/A_o) \cong 2\pi RY/2\pi R^2 \cong (Y/R)$.

Thus, an approximate angle $\theta$ can be obtained simply by dividing the input signal Y by R which is the vector sum of the X and Y input signals.

Figure 1:
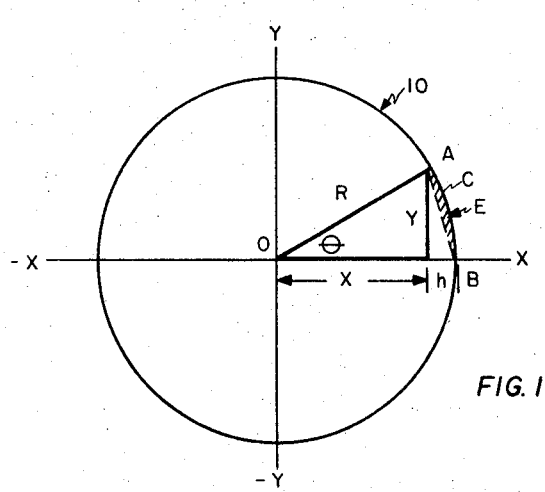
FIGS. 1, 2 and 3 are diagrammatic illustrations of X, Y and R relationship and representative functions to progressively evaluate the angle $\theta$ in both positive and negative directions.
Figure 2:
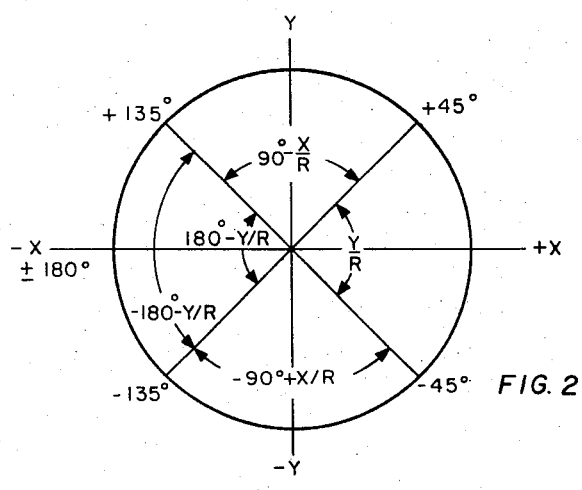

The error being proportional to the difference in areas of the triangle OAB and the sector OACB, FIG. 1, which in turn is proportional to the angle $\theta$, it is desirable to utilize small error areas and therefore small angles. One method of minimizing this error is by inserting different variables as a function of the angle $\theta$ as in FIG. 2. When Y/R becomes greater than 45°, the triange which would involve X/R must be computed and subtracted from 90°. Thus, the circle when divided into summable sections becomes as shown in FIG. 2. Comparing the magnitudes of X/R and Y/R will determine the switching points to be at +45° and ±135°. At these switch points the correct biases and functions can be fed to and utilized in an amplifier to produce the desired angle $\theta$.

Figure 3:
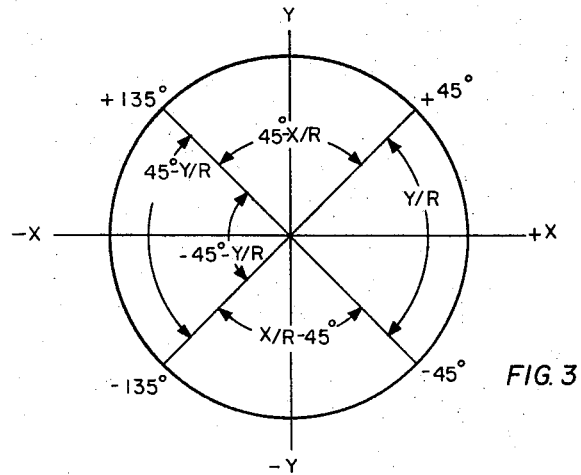

However, as shown in FIG. 3, it is preferred to allow the angle $\theta$ to be cumulative rather than to insert wholly new quantities as shown in FIG. 2. We have then from FIG. 3 the opportunity to sum positive angular accretions in the ranges of +0° to +45°, +45° to +135° and +135° to +225° (−135°) via the X − Y functions respectively, Y/R, 45° − X/R and 45° − Y/R. In the negative angular direction the ranges −0° to −45°, −45° to −135°, −135° to −225° (+135°) may be summed via the X − Y respective functions − Y/R, X/R − 45° and −45° − Y/R.

Electronic implementation of the diagram of FIG. 3 in a circuit to receive X and Y voltage inputs corresponding to angles $\theta$ and to transform or resolve the same into a corrected angle $\theta$, is shown in FIG. 4. That portion of the circuit at the top of FIG. 4 of the drawing and involving a vector summer 12, dividers 14 and 16, and inverters 18, 20, 22 and 24, is provided for development of the X − Y functions as set forth in FIG. 3 for the several angular ranges.

Thus, in FIG. 4, voltages representative of the coordinates X and Y are introduced respectively via lines 26 and 28 and via lines 30 and 32 as inputs to vector summer 12. Voltages X and Y are also passed as inputs to divider 14 by a line 34 and to divider 16 by a line 36. Vector summer 12 provides the radius vector R voltage on its output line 38 and passes the voltage corresponding to vector R as a second input to dividers 14 and 16 via lines 42 and 40. The output, X/R, of divider 14 is passed via lines 44 and 46 as one input to inverter 18. The other input to inverter 18 is via lines 48 and 50 from a −45° voltage source indicated, i.e., a voltage corresponding to the angle −45°. The output then of inverter 18 is 45° − X/R voltage which is passed on lines 52 and 54 to inverter 20. The output Y/R of divider 16 is fed on lines 56 and 58 as one input to inverter 22, the other input thereto being from the −45° voltage source via lines 48 and 60. The output of inverter 22 which is a voltage corresponding to 45°−Y/R is fed by lines 62 and 64 as one input to inverter 24. A second input to inverter 24 is obtained from the Y/R output line 56 via a line 68 and amplifier 70 set for a gain of 2 and a line 72. The gain of 2 in amplifier 70 as a second input to inverter 24, together with the input 45°−Y/R results in an output on line 74 of a voltage corresponding to the function −45°−Y/R. The input, 45°−X/R, to inverter 20 results in an output voltage on line 76 corresponding to the function X/R −45°. The output voltage, corresponding to function X/R, of divider 14 is passed on lines 44, 78 and 80 to inverter 19. The output of inverter 19 becomes the function −X/R on line 82. We have then in accordance with the portion of the circuit of FIG. 4 thus far described provided the means for providing the X, Y and R functions as required by FIG. 3 for progressive summation of angles in the ranges of +0° to +225° and −0° to −225°.

The remainder of the circuit of FIG. 4 comprises a voltage switching and summing means responsive to the functional outputs of said divider and inverter means described above to provide a summation analog voltage representative to the angle θ to which the X and Y voltage inputs correspond. More particularly in the remainder of FIG. 4 there is provided six diode clamping circuits which form a switching means for providing input voltages derived from the divider and inverter means and respectively corresponding to the angular ranges of 0° to 45°, 45° to 135°, 135° to 225°, −0° to −45°, −45° to −135° and −135° to −225°. These input voltages are fed to a summing amplifier 84. An inverter means 86 is connected to the output of the amplifier 84 by lines 88 and 90 and responds to said output to provide ambiguity resolving voltages as will be described hereinafter. The output of summing amplifier 84 is also applied to an operational amplifier 92 via line 88 and a line 94. The amplifier 92 is provided with an adjustable attenuator feedback means 96 connected by lines 98 and 100 from the output to the input of amplifier 92, for providing a scaled output of the desired analog voltage corresponding to the angle θ.

Considering the six diode clamping circuits which form the switching means mentioned above, clamping circuits 1 and 4 include a diode bridge 102 receiving a positive voltage input corresponding to +45° from terminal 104 via line 106, resistor 108, and line 110 connected to the anodes of bridge diodes 112 and 114 as indicated. This input provides for clamping at +45° voltage. To provide for clamping at −45° voltage, the cathodes of bridge diodes 116 and 118 are connected via line 120, a resistor 122 and a line 124 to a terminal 126 which acts as a source of negative voltage corresponding to −45°. The functional input to bridge 102 is the voltage Y/R obtained from the divider 16 via lines 56 and 128. The output of bridge 102 is passed via a line 130, resistor 132, and a line 134 to the summing amplifier 84. The first clamping circuit thus provides a voltage input to the summing amplifier 84 which is the function of Y/R between +0° and +45°, clamping at the voltage corresponding to +45°. The fourth clamping circuit performs the same function except that it clamps at −45° voltage and covers the range of −0° to −45°.

For the first and fourth clamping circuits described above and for the remainder of the clamping circuits to be described, it is necessary to provide a positive and negative reference voltage source circuit and suitable resistors as supply power sources for the overall switching circuit. Suitable voltage values which have been used are + and − 10 volts. With different resistors + and − 100 volts could also be used. Thus, as shown in FIG. 4, voltage from a positive reference voltage source, terminal 136, is connected via line 138, a resistor 140, a line 142, an output diode 144 and resistor 146 to lines 148 and 134 leading to summing amplifier 84. A negative reference voltage source, terminal 150 is connected via lines 152 and 154, resistor 156, line 158, diode 160, resistor 162, and lines 164, 148 and 134 to the summation amplifier 84.

The second diode clamping circuit includes the resistor 140, diode 144 and additional diodes 166 and 168. The anodes of diodes 144, 166 and 168 are connected by lines 170, 172 and 174 as shown. The cathode side of diode 166 is connected by a line 176 to the output line of inverter 18 to provide an input voltage corresponding to the function 45° −X/R. The cathode side of diode 168 is connected by a line 178 to terminal 180 acting as a source of voltage corresponding to +90° as a clamping voltage. The second circuit thus, as indicated in FIG. 3, covers the angular range of +45° to +135°.

The fifth diode clamping circuit includes the diode 160, resistor 156 and two additional diodes 182 and 184 having their cathodes connected to the cathode side of diode 160 via lines 186, 188, 190 and 192, and their anodes connected respectively by line 76 to the output of inverter 20 to introduce the functional voltage X/R − 45° and by line 194 to terminal 196 as a source of −90° clamping voltages. The fifth diode clamping circuit then covers the range of −45° to −135° as shown in FIG. 3.

The third diode clamping circuit comprises the diodes 198, 200, 202 and 204 and resistors 206 and 208. The positive reference source terminal 136 is connected to the anode side of diodes 198, 200, 202 and 204 via lines 138 and 139, resistor 206, and lines 210, 212, 214, 216, 218, 220 and 222. The cathode side of diode 198 is connected to the summing amplifier via a line 224 and lines 148 and 134. The cathode side of diodes 200, 202 and 204 are connected respectively by line 82 to the −X/R function voltage of inverter 19, by a line 226 to the 45° − Y/R function voltage of inverter 22 and by lines 228 and 230 to the $\theta_1$ function output of inverter 86. The third diode clamping circuit thus covers the range of +135° to +225°.

The sixth diode clamping circuit comprises the diodes 232, 234, 236 and 238, having their cathode sides connected together by lines 240, 242, 244, 246, 248 and 250, together with the resistors 252 and 254.

The anode of diode 232 is connected via resistor 252 and lines 224, 148 and 134 to the input side of summing amplifier 84. Negative reference power is supplied to clamping circuit six from negative reference terminal 150 via lines 152 and 256 to resistor 254. The functional input X/R is supplied to the anode side of diode 234 from divider 14 via lines 78 and 258. The functional input −Y/R −45° is applied to the anode of diode 236 from inverter 24 via line 74. The input functions in the sixth clamping circuit provide for a voltage output covering the angular range of −135° to −225°. To eliminate any ambiguity which may exist between positive and negative angles, the angle on input from inverter 86 of the voltage corresponding to $\theta_1$, a voltage derived from the summing amplifier 84, is applied to the negative section via lines 230 and 262 to diode 238 and to the positive segment of the switching circuit via lines 230 and 228 to diode 204. Thus, for positive values of $\theta_1$, the negative segments are inhibited and for negative values of $\theta_1$, the positive segments are inhibited.

In considering the operation of the circuit of FIG. 4, the upper portion of the circuit including the vector summer 12, dividers 14 and 16, and inverters 18, 20, 22 and 24 provide means for receiving X and Y inputs and for providing output voltages corresponding to the angular functions shown in FIG. 3. The lower portion of FIG. 4 is the switching and summation means for cumulatively summing in a positive or negative direction voltages corresponding to the angular summation quantities. The quantities are stored and held at the switch points ±45° and ±135°. As the angle is increased the newly generated quantities are added to the previously held quantities. These quantities are voltages representative of functions of X, Y and R which correspond to angles dependent upon the value and polarity of X, Y and R.

To demonstrate the above, Y/R represents the angle $\theta$ between ±45° (see FIG. 3). At +45°, Y/R will hold its value as a clamped voltage limit (the effect of the first clamping circuit) and the function 45° − Y/R is zero. As the angle $\theta$ increases, the value of 45° − X/R will increase and is added (by the second clamping circuit) to the held, i.e., clamped, value of Y/R established by the first clamping circuit. At 135° the function 45° − X/R will equal 90° and will be held at that value by the clamping effect of the second clamping circuit. Beyond the 135° angle the voltage value of function 45° − Y/R will be added to the previous held values corresponding respectively to the 45° angle Y/R limit and the 90° angle 45° − X/R limit. The 45° − Y/R and −45° Y/R value must be multiplied by two to compensate for the decreasing Y/R value which had been stored in the first segment and which decreases in value between +135° and +180°.

In the six diode clamping circuits the first, second and third provide inputs to the summing amplifier 84 for adding voltages in the ranges of 0° to 45°, 45° to 135°, and 135° to 225°. The fourth, fifth and sixth clamping circuits provide input to the summing amplifier 84 for adding voltages in the ranges of −0° to −45°, −45° to −135°, and −135° to −225°.

The diode bridge 102 has the voltages representing ±45° across the bridge as shown. The input is a voltage corresponding to the angle represented by Y/R and the output on line 130 will therefore be Y/R within the ±45° limits, at which limits its value will be held, i.e. clamped, until Y/R becomes less than the limit value. Diode bridge 102 and its associated components represents the first and fourth clamping circuits, the first for clamping at +45° and the fourth for −45° clamping.

The remaining clamping circuits, i.e., the second and third and the fifth and sixth, are all similar and will only pass the lower value of its inputs and will block any signal of the wrong polarity. For example, considering the second clamping circuit which involves the diodes 144, 166 and 168 and which has an input function of 45° − X/R, this circuit covers the angular segment of +45° to +135°. In considering the operation of this second clamping circuit let us assume that the angle $\theta$ is between +0° and +45°. Under this condition the voltage corresponding to the function 45° − X/R will be a negative value and will be shorted through its diode 166 but blocked by diode 144 preceding the summing resistor 146 because the negative voltage is applied to the anode of the diode 144. The voltage at the junction of the three diodes 144, 166 and 168 will be equal to 45° − X/R value minus the diode drop. The negative voltage at the junction of the diodes will reverse bias the diode 168 in series with the 90° angle voltage source constant in the segment +45° to +90°, making it ineffective. Thus, the input to the summing amplifier 84 from the second clamping circuit, under the condition of Y/R being equal to or less than +45°, is zero.

Consider now the operation of the same second circuit for an angle beyond +45°. Beyond +45° the function 45° − Y/R becomes positive, the anode of diode 144 is not negatively biased and it will conduct current from the reference voltage source indicated to the summing amplifier 84 to add to the clamped voltage input from the first clamping circuit. The voltage at the junction of the diodes 144, 166 and 168 will be clamped at the voltage value of the function 45° − X/R value plus the diode voltage drop. The diode 168 in series with the 90° constant voltage will be reversed biased until X/R = −45°, making the X/R −45° = 90° and clamping the segment, +45° to +135°, to a 90° value voltage. Thus, at +135° we have the sum of the clamped values of Y/R and 45° − X/R.

Considering the operation of the third clamping circuit including the diodes 198, 200, 202 and 204, the input functional voltage is a voltage corresponding to 45° − Y/R. However, for the angular ranges of 0° to +45° and +45° to +135° the input −X/R is a negative value which applied to the anode side of diode 198 biases the diode to inoperative condition and the output of the circuit is zero. In the angular range of +135° to +225°, the polarity of −X/R is positive and the blocking negative bias on diode 198 is removed. However, ambiguity may exist in the quadrant between +135° and −135°. This may be overcome by utilizing the polarity of Y or Y/R to insure the correct variable will be introduced at the respective switch points +135° and −135°. In the third and sixth circuits of FIG. 4, the voltage output of angle $\theta_1$ is taken from the output of summing amplifier 84 and applied as inputs to the respective diodes 238 of the negative sixth circuit and 204 of the positive angle third circuit. Thus, for positive values of $\theta_1$, the negative segment, i.e., circuit six, is inhibited because a positive polarity bias is applied to diode 232 to place it in inoperative condition and condition circuit six to zero output. In relation to the third circuit for positive values of angle $\theta_1$, the diode 198 is in condition for passing current, but for negative polarity of angle $\theta_1$, diode 198 would be negatively biased to inoperative condition and there would be zero output from the third circuit.

One further point about the third and sixth circuits is that the $45° - Y/R$ and the $-45° - Y/R$ values must be multiplied by two to compensate for the decreasing Y/R value which had been stored in the first segment, Y/R, and decreases in value between $+135°$ and $180°$. This is accomplished in the circuit of FIG. 4 by making the value of resistors 208 and 252 respectively of the third and sixth circuits each one-half of the value of the corresponding resistors 132, 146 and 162 in the first and second and fourth and fifth circuits.

Referring to FIG. 1, it will be noted that the computed angle will always be smaller than the actual angle because the area of the triangle, OAB, will always be less than the segment OACB area. This error can be reduced by using a conversion factor somewhat greater than 57.3 in the conversion from radians to degrees. In the preferred embodiment of the invention, FIG. 4, this conversion factor is controlled by the potentiometer 96 on the operational amplifier 92. A system built as shown in FIG. 4 had a maximum error of $\pm 1°$ over the $\pm 180°$ range. To obtain increased accuracy the number of break points can be increased. With break points every 22.5 degrees, the theoretical accuracy is better than $\pm 10$ minutes.

What is claimed is:

1. A polar resolver for providing an analog voltage representative of the angle $\theta$ corresponding to any given X and Y coordinates provided as X and Y voltage inputs, said resolver comprising:

vector summer means for receiving said X and Y input voltages and providing corresponding vector radius R voltage outputs;

divider means and inverter means responsive to said X and Y inputs for providing output voltages which are functions of X, Y and R, each function representative of particular progressive angular accretions of angle $\theta$;

voltage switching and summing means responsive to the outputs of said divider and inverter means to provide a summation analog voltage representative of the angle $\theta$ to which said X and Y voltage inputs correspond.

2. Apparatus according to claim 1, said summing and switching means including:

summing amplifier means for providing the sum of first, second, twice a third, fourth, fifth and twice a sixth inputs thereto from said divider and inverter means and corresponding respectively to the ranges of 0° to 45°, 45° to 135°, 135° to 225°, $-0°$ to $-45°$, $-45°$ to $-135°$ and $-135°$ to $-225°$;

a first diode clamping circuit responsive to an operating input voltage of Y/R and a clamping voltage corresponding to 45° to provide said first input to said summing amplifier means;

a second diode clamping circuit responsive to an operating input voltage of $45° - X/R$, a clamping voltage of 90°, and an ambiguity resolving voltage to provide said second input to said summing amplifier means;

a third diode clamping circuit responsive to an operating input voltage of $-Y/R$, and an ambiguity resolving voltage to provide said third input to said summing amplifier means;

a fourth diode clamping circuit responsive to an operating input voltage of Y/R, and a clamping voltage of $-45°$ to provide said fourth input to said summing amplifier means;

a fifth diode clamping circuit responsive to an operating input voltage of $X/R - 45°$, a clamping voltage of $-90°$, and an ambiguity resolving voltage to provide said fifth input to said summing amplifier means;

a sixth diode clamping circuit responsive to an operating input voltage of X/R, a clamping voltage of $-Y/R - 45°$, and an ambiguity resolving voltage;

inverter means, responsive to the output of said summing amplifier means, for providing said ambiguity resolving voltages; and operational amplifier means, responsive to the output of said summing amplifier means and comprising an adjustable attenuator feedback, for providing a scaled output of the desired analog voltage corresponding to the angle $\theta$.

* * * * *